United States Patent [19]

Kurz et al.

[11] 3,855,190

[45] Dec. 17, 1974

[54] PROCESS FOR SUSPENSION POLYMERIZATION OF VINYL CHLORIDE WITH LOW POLYMER DEPOSITION

[75] Inventors: Kieter Kurz; Johann Bauer; Thomas Balwe, all of Burghausen; Kurt Fendel, Leverkusen-Schildgen; Alex Sabel, Burghausen, all of Germany

[73] Assignee: Wacker-Chemie GmbH, Munich, Germany

[22] Filed: Mar. 15, 1974

[21] Appl. No.: 451,502

[30] Foreign Application Priority Data

Mar. 16, 1973 Germany............................ 2313277

[52] U.S. Cl.... 260/87.1, 260/78.5 R, 260/85.5 XA, 260/85.5 N, 260/87.5 R, 260/87.5 A, 260/87.5 C, 260/87.7, 260/92.8 W
[51] Int. Cl............................ C08f 3/30, C08f 15/30
[58] Field of Search......... 260/92.8 W, 87.1, 87.5 R

[56] References Cited
UNITED STATES PATENTS

| | | | |
|---|---|---|---|
| 3,544,539 | 12/1970 | Koyanagi et al. | 260/92.8 W |
| 3,738,974 | 6/1973 | Takehisa et al. | 260/92.8 W |
| 3,778,423 | 12/1973 | Reiter | 260/92.8 W |

Primary Examiner—Harry Wong, Jr.
Attorney, Agent, or Firm—Hammond & Littell

[57] ABSTRACT

An improvement in the suspension polymerization of a polymerizate containing at least 80% of polyvinyl chloride with low polymer deposits by the steps of mixing (1) monomers selected from the group consisting of vinyl chloride and mixtures of vinyl chloride with up to 20% by weight of olefinically monounsaturated compounds copolymerizable with vinyl chloride, (2) an oil-soluble free-radical forming polymerization catalyst, (3) suspension stabilizers and optionally other polymerization aids, and (4) water, heating said mixture under agitation to polymerization temperatures and recovering said polyerizate, the improvement comprises using from 0.001% to 1% by weight, based on the monomers, of a percompound selected from the group consisting of unbranched diacyl-peroxides having from 12 to 18 carbon atoms in each acyl and dialkylperoxy dicarbonates having 12 to 18 carbon atoms in each alkyl, as the oil-soluble free-radical-forming polymerization catalyst, and adding from 5 to 35 ppm, based on the monomers, of at least one Wurster's salt to the polymerization charge, and conducting said polymerization at a pH of from 3.5 to 7, whereby a polymerizate is recovered with low polymer deposits.

8 Claims, No Drawings

PROCESS FOR SUSPENSION POLYMERIZATION OF VINYL CHLORIDE WITH LOW POLYMER DEPOSITION

THE PRIOR ART

In the production of polyvinyl chloride by suspension polymerization, the inner wall of the polymerization autoclave is generally incrustated more or less with polymer, regardless of the finish or surface quality of the inner wall. These incrustations, films or other deposits must normally be removed after each change in the large-scale production of PVC in order to permit an unhindered elimination of the reaction heat. If the polymer deposits are not removed, the cooling capacity of the autoclave is reduced and uneconomical long reaction times are the result. In addition, the quality of the resultant polymerizate suffer because the crust precursors partly get into the end product and, as difficultly plasticizable particles, show up as "fish eyes."

For cleaning the autoclave, a man must usually enter the autoclave under corresponding protective measures in order to scrape off the wall with a spatula. This cumbersome measure reduces the economical usefulness of the autoclave because of the great time consumption involved in its cleaning. Particularly problematic is the spatula-cleaning in autoclaves with specially prepared surfaces, such as polished or enamelled inner walls. Here damages caused by the entering and scraping are unavoidable, as experience has shown, so that the high-grade finishes of the inner walls of the autoclaves are scratched this way.

Furthermore, spraying devices are frequently used where a water jet is used for cleaning under high pressure. These devices can only be used successfully, however, in the case of light incrustations. Complete cleaning is frequently not possible this way. Beyond that, the time gained, compared to spatula cleaning, is in most cases insignificant.

In new autoclaves with polished or enamelled inner walls it was found that only a light coat is formed or deposited at first. But this effect is lost after a certain operating time, for reasons which are not exactly known, so that here too spatula cleaning is unavoidable.

OBJECTS OF THE INVENTION

An object of the present invention is the development of improved processes for the suspension polymerization of vinyl chlorides where the polymer deposits are substantially eliminated thus enabling repeated polymerizations in the reactor without necessity for its cleaning after each polymerization.

Another object of the present invention is the development, in the suspension polymerization process for the production of polymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically mono-unsaturated compounds copolymerizable with vinyl chloride, (2) an oilsoluble free-radical-forming polymerization catalyst, (3) suspension stabilizers and optionally other polymerization aids, and (4) water, heating said mixture under agitation to a polymerization temperature of between 0°C and 80°C, and recovering said polymerizate, of the improvement which consists in using from 0.001 to 1% by weight, based on the monomers of a percompound selected from the group consisting of unbranched diacyl-peroxides having from 12 to 18 carbon atoms in each acyl and dialkyl-peroxy dicarbonates having 12 to 18 carbon atoms in the alkyl, as said oil-soluble free-radical-forming polymerization catalyst, and adding from 5 to 35 ppm, based on the monomers, of at least one Wurster's salt to the polymerization charge, and conducting said polymerization at a pH of from 3.5 to 7, whereby a polymerizate is recovered with low polymer deposits.

These and other objects of the invention will become more apparent as the description thereof proceeds.

DESCRIPTION OF THE INVENTION

This invention is based on the problem of reducing the wall deposits of polymers in the suspension polymerization of vinyl chloride, if necessary, together with a comonomer, in conventional factory autoclaves to such an extent that a repeated sequence of charges can be run without spatula-cleaning of the autoclave.

The subject of the invention is a method for the polymerization of vinyl chloride or the copolymerization of vinyl chloride with up to 20% additional mono-olefin-unsaturated monomers in the aqueous phase in the presence of oil-soluble radical-formers, dispersing agents and, if necessary, other polymerization aids, characterized in that unbranched diacyl-peroxides having a chain length of 12 to 18 carbon atoms in each acyl and/or dialkyl-peroxy dicarbonates having alkyl radicals with 12 to 18 carbon atoms are used as oil-soluble radical-formers in quantities of 0.001 to 1.0% by weight, preferably 0.005 to 0.5% by weight, based on the monomer, and that 5 to 35 ppm, based on the monomer, of one or several Wurster's salts are added to the polymerization charge, and that the polymerization is carried out at a pH of from 3.5 to 7.

More particularly, the invention relates to an improvement in the suspension polymerization process for the production of polymerizates selected from the group consisting of polyvinyl chloride and copolymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically monounsaturated compounds copolymerizable with vinyl chloride, (2) an oil-soluble free-radical-forming polymerization catalyst, (3) suspension stabilizers including protective colloids and, optionally, other polymerization acids, and (4) water, heating said mixture under agitation to a polymerization temperature of between 0°C and 80°C, and recovering said polymerizate, the improvement which consists in using from 0.001 to 1% by weight, based on the monomers, of at least one percompound selected from the group consisting of an unbranched dialkanoyl-peroxide having from 12 to 18 carbon atoms in each alkanoyl and an unbranched dialkyl-peroxy dicarbonate having 12 to 18 carbon atoms in the alkyl, as said oil-soluble free-radical-forming polymerization catalyst, adding from 5 to 35 ppm, based on the monomers, of a Wurster's salt to the polymerization charge, and conducting said polymerization at a pH of from 3.5 to 7, whereby a polymerizate is recovered with low polymer deposits.

In the polymerization method according to the invention, the formation of crusts or polymer deposits in the autoclave wall and fittings is prevented to a great extent. It is thus possible that a number of polymerization charges can be run without intermediate cleaning, both in small test autoclaves and in large factory autoclaves without extending the polymerization time or reducing the quality of the product. Even in older autoclaves whose walls had been greatly damaged by frequent spatula cleaning, incrustation is prevented to a great extent. The method according to the invention can be used with great advantage in autoclaves with polished, enamelled or otherwise specially treated, hence easily damaged inner walls. In autoclaves of this type, mechanical spatula cleaning can mostly be completely foregone, since the adhesion of the light polymer deposits formed after a number of successive charges, is so low that cleaning with a water sprayer alone is usually completely sufficient. Entering the autoclave for spatula cleaning is thus not necessary, so that a maximum use of the autoclave is ensured.

The recipes generally employed in suspension polymerization can also be used in the method of the invention. The determining factor in the success of the procedure of the invention is that, on the one hand, an unbranched diacylperoxide with a chain length of 12 to 18 carbon atoms per acyl group and/or a dialkylperoxy dicarbonate with a chain length of 12 to 18 carbon atoms per alkyl group, are utilized as a peroxide compound, and, on the other hand, at least one Wurster's salt is used. In addition, the pH value of the aqueous phase must be between 3.5 and 7 during the polymerization.

The peroxide compounds employed are the unbranched diacyl peroxides, for example, the unbranched dialkanoylperoxides having from 12 to 18 carbon atoms in each alkanoyl group, such as dilauroylperoxide, and/or the unbranched dialkylperoxy dicarbonates having from 12 to 18 carbon atoms in each alkyl group, such as distearylperoxy dicarbonate and especially dicetylperoxy dicarbonate. The peroxides can be used individually or in mixture. It is possible to charge the entire peroxide at the start of the polymerization, but adding the peroxide in doses during the polymerization may also be of advantage.

The Wurster's salts are well known and are commonly disclosed as having the following formulae:

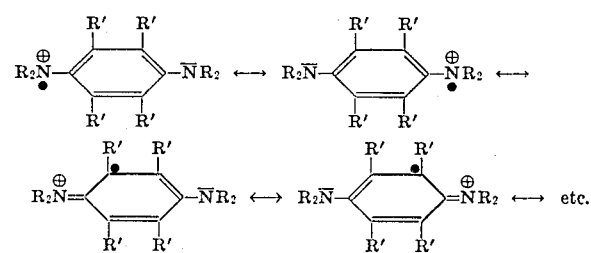

In the above, R represents hydrogen or alkyl having 1 to 4 carbon atoms, preferably methyl, and R' likewise represents hydrogen or alkyl having 1 to 4 carbon atoms, preferably methyl, but only three of the four R' on the benzene can be an alkyl.

The production of the Wurster's salts, which have an unpaired electron, is effected best by oxidation of the corresponding p-phenylenediamines, for example, with bromine. The production of Wurster's salts and examples of suitable p-phenylenediamines are described in J. Amer. Chem. Soc. 61, 1981 (1939). The amounts used vary between 5 and 35 ppm, based on the monomers. Under 5 ppm the effect diminished increasingly, and an excess over 35 ppm may cause a disturbance of the course of the polymerization.

The production of these salts can be effected on the spot in the polymerization autoclave. But it is also possible to produce several prepared solutions of the salt, mostly in the aqueous phase, and to add them to the polymerization autoclave at one time or in doses during the polymerization. The amount of the active or radical Wurster's salt is determined on the basis of the oxidant used up for the oxidation, particularly bromine.

The production is effected, for example, in an aqueous solution according to the following:

SOLUTION A p-Phenylenediamine or N-alkylated derivatives of this amine are suspended in water and converted with a stoichiometric amount of hydrogen chloride into the corresponding dihydrochlorides.

SOLUTION B

The bromine required for the oxidation is dissolved in a corresponding amount of water.

Both solutions are stored separately, and shortly before the state of the polymerization the solutions are combined and added to the polymerization batch.

The polymerization is carried out according to the known methods of suspension polymerization at temperatures of between 0°C and 80°C, preferably from 30°C to 80°C and pressures frequently between 1 and 15 atmospheres. Mostly the polymerization is effected at the autogenous pressure of the monomers. If comonomers gaseous at normal temperature, such as ethylene or propylene, are employed, it may be necessary to work at pressures above 15 atmospheres, for example, 40 to 60 atmospheres.

Mainly cooled autoclaves are used having cooled or jacketed shells and, possibly, also cooled or jacketed covers. These autoclaves usually are supplied with stirring devices, baffle plates and flow disturbers and are optionally equipped with any required dosing devices. The attachment of a reflux condenser is also possible.

The quantitative ratio of water to the total amount of the monomer is not a determinant factor. The portion of the monomer in the total amount of water and monomer is mostly 10 to 60% by weight, preferably 20 to 50% by weight. Water can also be added during the polymerization. Furthermore, it is possible to add up to 50% by weight of water-soluble organic solvents to the aqueous phase, for example, water-soluble alkanols such as methanol and ethanol.

The dispersing agents or suspension stabilizers including protective colloids are those generally used in suspension polymerization. Protective colloids or dispersing agents ordinarily employed are, for example, polyvinyl alcohol, which can contain up to 40 mol percent of acetyl groups, gelatin, polyvinyl pyrrolidone, cellulose ethers, preferably of the water-soluble type, such as methyl cellulose, hydroxyethyl cellulose, methylhydroxyethyl cellulose, hydroxypropyl cellulose, methylhydroxypropyl cellulose, carboxylmethyl cellulose, as well as cellulose ethers containing amino groups, water-soluble salts of copolymers of maleic acid or its half esters with styrene, ethylene or vinyl esters, mixtures of these protective colloids as well as protective colloid emulsifier combinations. Amphoteric, as well as cationic or anionic emulsifiers can be used. Amounts of 0.03 to 1.5% by weight, based on the water content are used. The necessary amounts can be charged at the beginning or added in doses.

Furthermore it is possible within the framework of the claimed method to use the additives generally employed in small amounts in the suspension polymerization of vinyl chloride, such as particle size regulators, for example, inorganic salts, such as sodium chloride or calcium chloride; buffer salts, such as sodium bicarbonate, sodium carbonate, calcium carbonate, alkali metal phosphates, such as secondary potassium phosphate; molecular weight regulators, such as aliphatic aldehydes or alkanals, chlorinated hydrocarbons, such as di- and tri-chloroethylene, chloroform, mercaptans, or olefins, such as propylene, isobutylene and cyclohexene.

The method of the invention is also suitable for the preparation of copolymerizates of vinyl chloride with up to 20% by weight of olefinically mono-unsaturated compounds copolymerizable with vinyl chloride.

Examples of olefinically mono-unsaturated compounds copolymerizable with vinyl chloride which can be used as comonomers are particularly vinyl esters of alkanoic acids with 1 to 20 carbon atoms, preferably vinyl acetate. Other vinyl esters which can be used are: vinyl propionate, vinyl butyrate, vinyl 2-ethyl-hexaonate, vinyl laurate, vinyl esters of $\alpha$-branched alkanoic acids having 8 24 carbon atoms, such as "Versatic acids," vinyl esters of isotridecanoic acid (an isomer mixture of highly branched compounds, which contains primarily tetramethyl nonanoic acid); vinyl halides, for example, vinyl fluoride, vinylidene fluoride, vinylidene chloride; unsaturated carboxylic acids and their mono- or diesters with alkanols with 1 to 10 carbon atoms, such as acrylic acid, methacrylic acid, crotonic acid, fumaric acid, maleic acid, and itaconic acid, such as 2-methylhexyl acrylate, methyl methacrylate, maleic acid di- or mono-2-ethylhexyl ester, dioctyl fumarate; olefins, such as ethylene, propylene, butylene, allyl compounds and acrylo nitrile. Mixtures of the monomers can also be used. Both the comonomers and the vinyl chloride can be added during the polymerization.

The polymerizates produced can be utilized in all forms of utilizations previously employed for suspension polymerized vinyl chlorides.

The following examples are illustrative of the invention without being limitative in any manner.

EXAMPLE 1

Comparison Example

In a 100-liter V2A autoclave with stirrer, whose wall showed clear signs of use as a result of spatula cleaning, such as scratches and nicks, 81 gm of partly saponified mediumviscous polyvinyl alcohol (hydrolysis degree 70 mol percent) were dissolved under stirring in 44 kg of fully deionized water. After adding 73 gm of dilauroyl-peroxide, the air was removed in known manner from the closed autoclave. Then 27 kg of vinyl chloride were added under stirring. The reaction mixture was then heated to 54°C and maintained there during polymerization. As soon as the pressure drops to 1.5 atm., the polymerization was terminated by cooling and distilling off the unused vinyl chloride. The monomer conversion under the selected conditions was 85%. The pH value of the aqueous phase was between 3.7 to 4.4. The polymerization time was 8 hours.

With this recipe, it was possible to polymerize four batches in succession without spatula cleaning. After each bath it was only necessary to rinse off the loosely adhering PVC with water. Spatula cleaning of the autoclave wall after 4 batches yielded a polymer crust of 1,780 gm of dry substances.

EXAMPLE 2

The foregoing comparison example was repeated with the change that an additional 8.3 ppm of the dihydrochloride of p-phenylenediamine and 4 ppm of bromine (based on the vinyl chloride) were added to the aqueous phase. Under otherwise equal conditions, with a pH value of the aqueous phase of 3.5 to 4.6, spatula cleaning after four batches yielded 570 gm. In another test series, eight batches could be polymerized before spatula cleaning seemed indicated.

EXAMPLE 3

A repetition of Example 2 but with the utilization of 9 ppm of the dihydrochloride of N,N-dimethyl-p-phenylenediamine and 6 ppm of bromine, with a pH value of the aqueous phase of 4.0 to 4.9, yielded 1 kg of dry substances after four batches.

EXAMPLE 4

A repetition of Example 2, but with the utilization of 9 ppm of the dihydrochloride of N,N,N',N'-tetramethyl-p-phenylenediamine and 6 ppm of bromine, with a pH value of the aqueous phase of 3.8 to 4.5, yielded 930 gm of dry substances after four batches.

EXAMPLE 5

Comparison Example

A V2A-steel autoclave of 2 m$^3$ capacity with stirrer was utilized, whose wall showed marked traces of use, such as scratches and nicks as a result of frequent spatula cleaning. 855 gm of partially saponified medium-viscous polyvinyl alcohol were dissolved therein under stirring in 930 kg of fully deionized water. After adding 342 gm of dicetylperoxy dicarbonate, the air was removed from the closed autoclave in a known manner. Then 570 kg of vinyl chloride were added under stirring (130 rpm). The reaction mixture was heated to 54°C. After about 9 hours the pressure began to drop. As soon as the pressure drop had reached 1.5 atm., the polymerization was terminated by cooling and distilling off the unused vinyl chloride. The monomer conversion under the selected conditions was 85%. The pH value of the aqueous phase was 3.8 to 4.2. After six batches, spatula cleaning of the autoclave yielded 870 gm of dry substances.

EXAMPLE 6

The foregoing comparison Example 5 was repeated with the change that an additional 25 ppm of the dihydrochloride of p-phenylenediamine and 11 ppm of bromine were added to the aqueous phase. Spatula cleaning after six charges, with a pH value of the aqueous phase of 3.5 to 4, yielded 200 gm of polymer crust.

EXAMPLE 7
Comparison Example

A repetition of Example 5 with 930 kg of water, 570 kg of vinyl chloride, 1,225 gm of dilauroyl peroxide and 835 gm of polyvinyl alcohol, with a polymerization time of 12 hours, after six batches, yielded 1,200 gm of wall polymer (pH value of the aqueous phase 3.6 to 3.9).

EXAMPLE 8

A repetition of Example 7 with an additional 16.6 ppm of the dihydrochloride of p-phenylenediamine and 7.5 ppm of bromine to each batch, after six batches yielded 400 gm of wall deposit (pH value of 4.0 to 5.0).

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. In the suspension polymerization process for the production of polymerizates selected from the group consisting of polyvinyl chloride and copolymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically mono-unsaturated compounds copolymerizable with vinyl chloride, (2) an oil-soluble free-radical-forming polymerization catalyst, (3) suspension stabilizers including protective colloids, and, optionally, other polymerization aids, and (4) water, heating said mixture under agitation to a polymerization temperature of between 0°C to 80°C, and recovering said polymerizate, the improvement which consists in using 0.001 to 1% by weight, based on the monomers, of at least one percompound selected from the group consisting of an unbranched dialkanoyl-peroxide having from 12 to 18 carbon atoms in each alkanoyl and an unbranched dialkylperoxy dicarbonate having 12 to 18 carbon atoms in the alkyl, as said oil-soluble free-radical-forming polymerization catalyst, adding from 5 to 35 ppm, based on the monomers, of a Wurster's salt to the polymerization charge, and conducting said polymerization at a pH of from 3.5 to 7, whereby a polymerizate is recovered with low polymer deposits.

2. The process of claim 1 wherein from 0.005 to 0.5% by weight, based on the monomers, of said percompound is employed.

3. The process of claim 1 wherein said percompound is an unbranched dialkanoyl-peroxide having from 12 to 18 carbon atoms in each alkanoyl.

4. The process of claim 3 wherein dilauroylperoxide is employed.

5. The process of claim 1 wherein said percompound is an unbranched dialkylperoxy dicarbonate having 12 to 18 carbon atoms in the alkyl.

6. The process of claim 5 wherein dicetylperoxy dicarbonate is employed.

7. The process of claim 5 wherein said dialkylperoxy dicarbonate is distearylperoxy dicarbonate.

8. The process of claim 1 wherein said olefinically mono-unsaturated compound copolymerizable with vinyl chloride is vinyl acetate.

* * * * *